United States Patent [19]

Donahue

[11] 4,425,601

[45] Jan. 10, 1984

[54] STAIRWAY LIGHTING SYSTEM

[76] Inventor: Robert Donahue, 36 Thorncreek Dr., Park Forest, Ill. 60466

[21] Appl. No.: 297,856

[22] Filed: Aug. 31, 1981

[51] Int. Cl.³ .................. F21S 1/02; F21V 33/00; E04F 11/00
[52] U.S. Cl. .................. 362/146; 200/86 R; 362/251; 362/272; 362/802
[58] Field of Search ............ 362/146, 147, 153, 251, 362/253, 272, 295, 394–395, 802; 340/326, 330, 541, 573, 666, 693; 200/86 R, 86.5, DIG. 2, DIG. 35

[56] References Cited

U.S. PATENT DOCUMENTS

| | | | |
|---|---|---|---|
| 934,122 | 9/1909 | Woodman | 362/146 X |
| 2,756,323 | 7/1956 | Tusly | 362/146 |
| 3,662,229 | 5/1972 | Graff | 340/666 X |
| 3,753,217 | 8/1973 | Willfurth | 362/146 |
| 3,991,415 | 11/1976 | Baar | 340/326 X |

FOREIGN PATENT DOCUMENTS 12590 of 1916 United Kingdom ................ 362/153

OTHER PUBLICATIONS

*Scientific American*, Apr. 13, 1912, "Automatic Cellar Switch".
*Industrial Catalog C-8*, Tapeswitch Corp. of America, Jun. 13, 1979.

*Primary Examiner*—Donald P. Walsh
*Assistant Examiner*—Donald G. Kelly
*Attorney, Agent, or Firm*—Sabin C. Bronson

[57] ABSTRACT

An improved apparatus for illuminating a plurality of stairs when in use involves a transformer to provide a reduced A. C. voltage; at least one light in proximity to the stairs to illuminate the stairs when at least a portion of the reduced A. C. voltage is supplied to the light and an electrical circuit including the light is formed; a rectifier to convert the reduced A. C. voltage to a D. C. voltage; a plurality of pressure sensitive switches associated with the rectifier and the treads of the stairs; physical pressure on the tread or treads acting to close at least one of the switches; and a relay in association with the pressure sensitive switches and light, and adapted to form the electrical circuit including the light in response to the closing of at least one of the pressure sensitive switches.

8 Claims, 2 Drawing Figures

U.S. Patent    Jan. 10, 1984    4,425,601
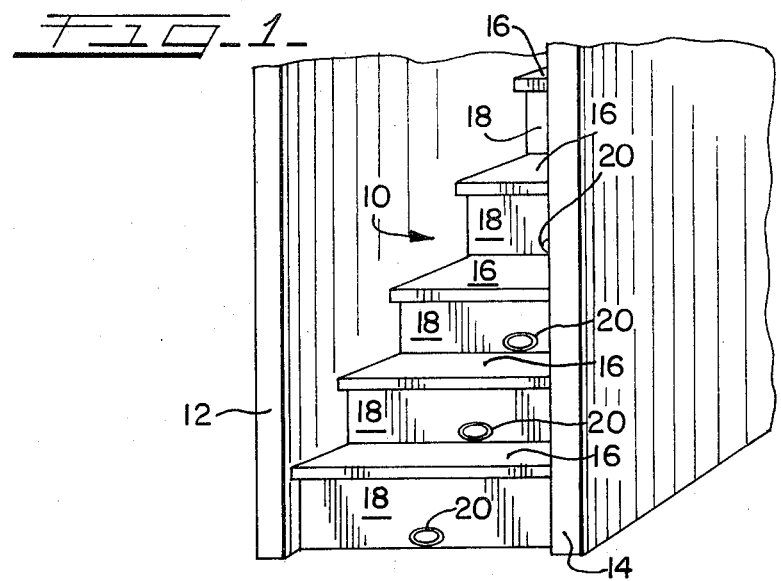
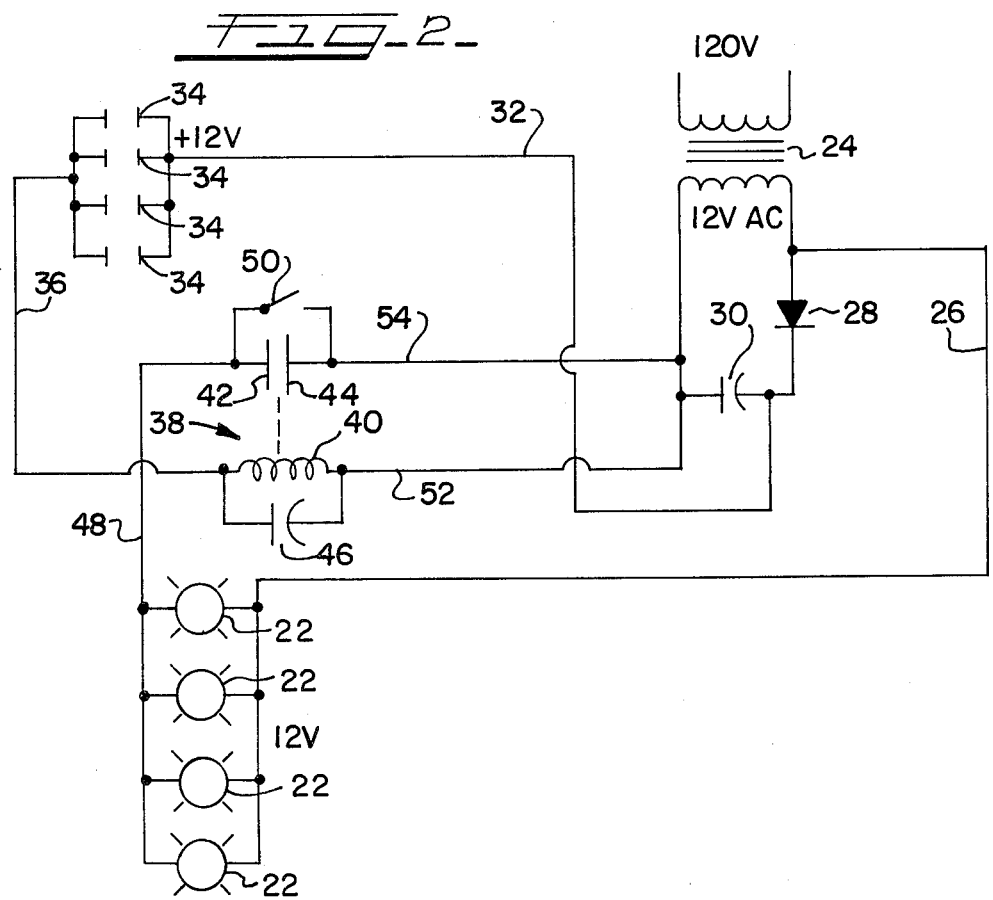

STAIRWAY LIGHTING SYSTEM

BACKGROUND AND SUMMARY OF THE INVENTION

This invention relates to a system for illuminating stairs when in use. More particularly, the invention relates to an improved apparatus which utilizes electrical potentials of reduced intensity to provide illumination of a plurality of stairs when the stairs are being used, e.g., by one or more human beings.

Darkened stairways can be very dangerous. It clearly would be desirable to illuminate such passageways. However, continuous lighting may be expensive and wasteful since stairways are often used only intermittently. Thus ideally, stairways should be lighted only when in use.

A prior art search made relative to the present invention identified the following U.S. Pat. Nos.: 934,122; 2,756,323; 2,911,519; 3,596,024; 3,017,497; 3,753,217; and 4,164,637.

One object of this invention is to provide an apparatus useful to illuminate stairs while the stairs are in use.

Another object of the present invention is to provide an apparatus useful to illuminate stairs which utilizes reduced electrical potentials. Other objects and advantages of the present invention will become apparent hereinafter.

An improved apparatus adapted to illuminate a plurality of stairs as one or more persons utilize the stairs has now been discovered. The system, ultimately powered by an A.C. (alternating current) line voltage source (such as is conventionally used in the United States), includes a transformer means adapted to reduce the A.C. line voltage from the source to provide a reduced A.C. voltage. At least one light means, preferably a plurality of light means connected in parallel to each other, is (are) located in proximity to the stairs. Such light means acts to illuminate the stairs when at least a portion of the reduced A.C. voltage is supplied to the light means and an electrical circuit including the light means is formed. Also included is a rectifier means associated with the transformer means and acting to convert the reduced A.C. voltage to a D.C. (direct current) voltage. A plurality of pressure sensitive switch means, e.g., conventional pressure sensitive grids or mats, are associated with the rectifier means so that at least a portion of the D.C. voltage is supplied to the pressure sensitive switch means. Each of these switch means is located in association with the tread of at least one of the stairs so that such switch means is closable in response to pressure, e.g., foot pressure, from a person using the stairs being applied to or placed on such tread. A relay means is provided in association with the pressure sensitive switch means and the light means. This relay means is adapted to form the electrical circuit including the light means in response to at least one of the pressure sensitive switch means being closed.

The present system functions to illuminate a plurality of stairs in response to the indicated presence of a person using the stairs. Thus, this apparatus provides light when it is needed, e.g., to guide a user of the stairs. Valuable energy is conserved because, for example, the light means may not illuminate if no one is using the stairs. Also, the reduced voltages or electrical potentials employed provide an added safety feature. In short, the present apparatus provides an effective reliable, inexpensive and safe system for illuminating a plurality of stairs.

In one preferred embodiment, the present device further comprises manual switch means associated with the light means. This manual switch is capable of being manually closed so as to cause the light means to illuminate the stairs irrespective of whether any of the pressure sensitive switch means are closed. This manual switch feature allows one to illuminate the stairs while not in use, e.g., for display or other purposes.

The light means, preferably a plurality of light means may be any switch device or devices capable of illuminating the stairs and also capable of operating with reduced A.C. voltages. It is preferred that each light means, e.g., incandescent light bulb, be located in association with the riser of a different one of the stairs to be illuminated.

The rectifier means also may be any device suitable to perform its function as set forth above. In one preferred configuration the rectifier means includes a diode and a capacitor in series.

It is preferred that each of the pressure sensitive switch means be associated with the tread of a different one of the stairs to be illuminated. Thus, in this embodiment, foot pressure on any of the stairs will cause the light means to illuminate the stairs.

Although any suitable relay means may be used, a preferred embodiment includes relay contacts, a relay coil and a relay capacitor connected in parallel with the coil. One feature of this preferred configuration is that the light means will give off steady and constant illumination (rather than the light means "flickering") as the stair user moves from the stair to stair, thus creating uneven pressure on the pressure sensitive switch means. In other words, this configuration advantageously provides for steady illumination of the stairs even though the pressure on the pressure sensitive switch means is uneven.

As indicated above, the transformer means acts to provide a reduced A.C. voltage. For improved safety and operation, it is preferred that this reduced A.C. voltage be in the range of about 3 volts A.C. to about 30 volts A.C., more preferably about 6 volts A.C. to about 18 volts A.C. Excellent results are obtained when the reduced A.C. voltage is about 12 volts A.C.

These and other aspects and advantages of the present invention are set forth in the following detailed description and claims, particularly when considered in conjunction with the accompanying drawings in which like parts bear like reference numerals.

BRIEF DESCRIPTION OF THE DRAWINGS

FIG. 1 is a front side view, in perspective of a stairway equipped with an embodiment of the present invention.

FIG. 2 is an electrical schematic diagram showing the components of the embodiment used for the stairway shown in FIG. 1.

DESCRIPTION OF THE PREFERRED EMBODIMENT

Referring now to the drawings, FIG. 1 shows a plurality of stairs, shown generally at 10, close between two walls 12 and 14. Each of the stairs includes a tread 16 and a riser 18. On each of the risers 18 is a transparent ornamental light encasement 20. Inside each encasement 20 is an incandescent light bulb 22.

FIG. 2 shows four (4) light bulbs 22 for convenience. The number of light bulbs 22 equals the number of risers 18. As shown in FIG. 2, light bulbs 22 are connected in parallel.

In FIG. 2, 120 volt A.C. line voltage is fed to step down transformer 24 which acts to provide 12 volts A.C. This reduced A.C. voltage is supplied via line 26 to each of light bulbs 22. Also, this reduced A.C. voltage is passed to the combination of diode 28 and capacitor 30 which acts to provide a D.C. voltage. This D.C. voltage is supplied via line 32 to each of four (4) pressure sensitive grids 34, which are connected in parallel. As with light bulbs 22, only four (4) pressure sensitive grids 34 are shown for convenience. However, the total number of pressure sensitive grids 34 equals the number of treads 16, with one pressure sensitive grid 34 located directly under each tread 16 and in position to be activated (closed) by pressure applied to each tread 16.

Pressure sensitive grids 34 are also connected via line 36 to a normally open relay, shown generally at 38. Relay 38 includes relay coil 40, relay contacts 42 and 44 and relay capacitor 46 which is connected in parallel with relay coil 40. Relay contact 42 is connected via line 48 to light bulbs 22. Normally, open manual switch 50 is connected between relay contacts 42 and 44. Relay coil 40 and relay contact 44 are connected back to transformer 24 via lines 52 and 54, respectively.

The embodiment of the present invention shown in the drawings functions as follows. With manual switch 50 in its normally open position and no one using the stairs 10, light bulbs 22 remain unlighted.

As someone steps on and applies foot pressure to one of the treads 16, the pressure sensitive grid 34 associated with such tread 16 closes to allow electrical energy (D.C. voltage from line 32) to flow across such closed pressure sensitive grid 34 to line 36. This D.C. voltge in line 36 activates relay 38 and causes the closing of relay contacts 42 and 44. With relay contacts 42 and 44 closed, a circuit is formed so that light bulbs 22 powered by the reduced A.C. voltage in line 26, illuminate the stairs 10.

As the user of the stairs 10 moves up (or down) the stairs 10, the first of the pressure sensitive grids 34 to close will open and other pressure sensitive grids 34 will open (and close) in turn. The momentary unevenness of pressure applied by the stair user will not cause the light bulbs 22 to flicker. The configuration of the embodiment shown, in particular that of relay 38, provides substantially steady illumination.

When the stair user is on the stairs 10, his (or her) way is lighted. As the user moves away from the stairs 10, all the pressure sensitive grids are open, and relay 38 returns to its normally open position. At this point, light bulbs 22 are unlighted and will remain so, for example, until another person uses the stairs 10.

It may be desirable, e.g., for display purposes, to light the bulbs 22 even though no one is using the stairs 10. In this situation, manual switch 50 can be closed. Such closing will cause light bulbs 22 to be lighted even though pressure sensitive grids 34 remain inactive. Light bulbs 22 are unlighted simply by opening manual switch 50.

While this invention has been described with respect to various specific examples and embodiments, it is to be understood that the invention is not limited thereto and that it can be variously practiced within the scope of the following claims.

What is claimed is:

1. An apparatus powered by an A.C. line voltage source which comprises a plurality of stairs each of which includes a tread and a riser, said plurality of stairs being useable by one or more persons; transformer means adapted to reduce said A.C. line voltage from said source to provide a reduced A.C. voltage; a plurality of light means acting to illuminate said stairs when at least a portion of said reduced A.C. voltage is supplied to said plurality of light means and an electrical circuit including said plurality of light means is formed, each said light means being located in association with a different one of said risers; rectifier means associated with said transformer means acting to convert said reduced A.C. voltage to a D.C. voltage; a plurality of pressure sensitive switch means associated with said rectifier means so that at least a portion of said D.C. voltage is supplied to said plurality of pressure sensitive switch means, each of said switch means being located in association with a different one of said treads so that said pressure sensitive switch means is closeable in response to pressure from said person placed on said tread; with which said pressure sensitive switch means is associated; and relay means in association with said plurality of pressure sensitive means and said plurality of light means, and adapted to form said electrical circuit in response to at least one of said pressure sensitive switch means being closed.

2. The apparatus of claim 1 which further comprises manual switch means associated with said light means and capable of being manually closed to form said electrical circuit and cause said plurality of light means to illuminate said stairs irrespective of any of said pressure sensitive switch means being closed.

3. The apparatus of claim 1 wherein said rectifier means includes a diode and a capacitor in series.

4. The apparatus of claim 1 wherein said relay means includes relay contacts, a relay coil and a relay capacitor connected in parallel with said relay coil.

5. The apparatus of claim 1 which includes a plurality of said light means connected in parallel to each other.

6. The apparatus of claim 1 wherein said reduced A.C. voltage is in the range of about 3 volts A.C. to about 30 volts A.C.

7. The apparatus of claim 1 wherein said reduced A.C. voltage is in the range of about 6 volts A.C. to about 18 volts A.C.

8. The apparatus of claim 1 wherein said reduced A.C. voltage is about 12 volts A.C.

* * * * *